Jan. 31, 1967 E. A. THOMASSEN 3,300,890
NESTABLE CRAB TRAPS
Filed Jan. 22, 1962
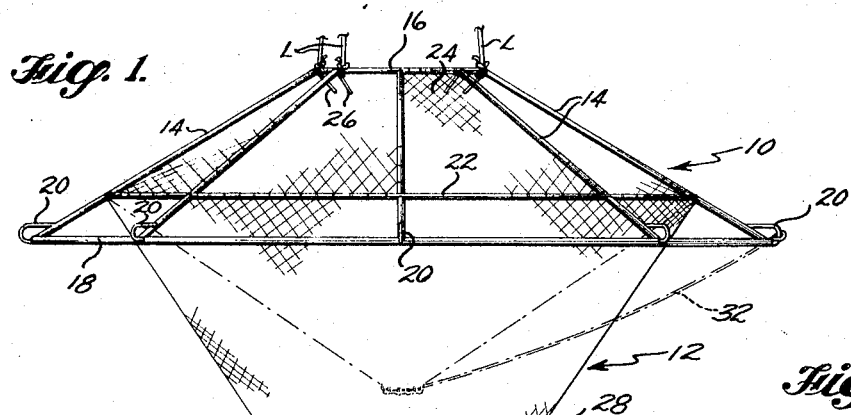
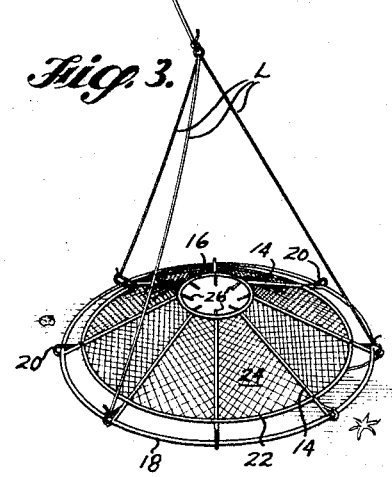
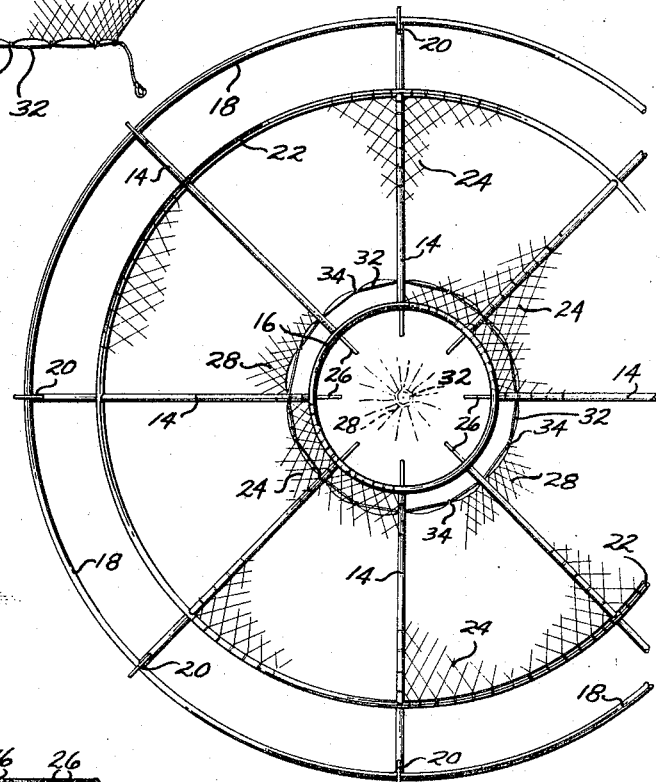
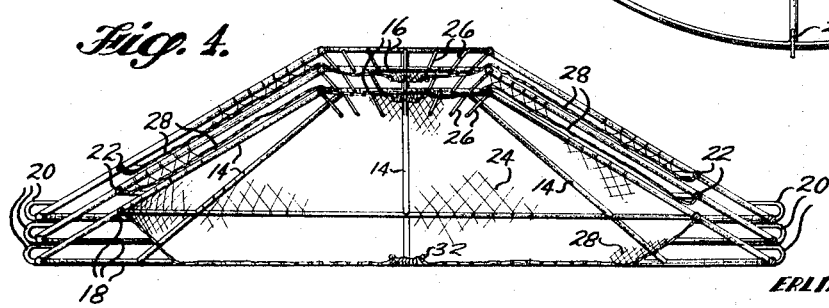
INVENTOR.
ERLING A. THOMASSEN
BY
Reynolds & Christensen
ATTORNEYS

United States Patent Office 3,300,890
Patented Jan. 31, 1967

3,300,890
NESTABLE CRAB TRAPS
Erling A. Thomassen, Seattle, Wash., assignor to Orland M. Christensen, Edmonds, Wash.
Filed Jan. 22, 1962, Ser. No. 167,641
6 Claims. (Cl. 43—100)

This invention relates to improved crab traps or pots and more particularly concerns a construction permitting compact nesting of similar traps for ease and convenience of handling and storage. The invention is herein illustratively described by reference to the presently preferred embodiment thereof; however, it will be recognized that certain modifications and changes therein with respect to details may be made without departing from the underlying essentials involved.

The traps used in fishing for Alaska king crabs, for example, are sometimes ten feet in diameter and as many as thirty are carried on a boat at one time. It would be desirable to carry more but even with thirty traps of conventional types the problem of handling and storage of the traps in the limited available space is difficult. Conventional traps do not nest together nor stack well. Their frustoconical or pyramidal shape with rigid side and bottom walls together with their substantial weight and large bulk impose these and similar limitations.

A broad object of this invention is to overcome these shortcomings of the previous traps while permitting them to be as large as necessary and to be of minimum weight without loss of strength and efficiency as a trap.

A specific object is to provide an improved crab trap or the like which is nestable compactly with similar traps while being of substantially optimum form to catch crabs.

A further object is a trap of simplified construction and maximum capacity for its cross-sectional dimensions.

The unloading of a crab trap is never a simple job, since with rigid traps of the type sometimes used, open only by way of a small opening through which a hand must be thrust, to grasp and withdraw crabs one by one from among perhaps a half dozen, each well-armed with claws, the job is difficult, time-consuming, and occasionally painful. Even in traps which have hinged panels the fisherman may have to expose his hands to the claws in releasing the panels; the traps are much too large to permit their ready tilting or inversion. It is a still further object of this invention to provide a crab trap from which crabs can be released by simply releasing a purse line, letting them drop from the trap all at once. The same construction facilitates baiting the trap.

Still another object is an improved trap meeting the foregoing objectives and capable of resisting abrasion and wear in handling and storage and also in use. In this regard the improved trap comprises a bottom protector which prevents chafing and wear of open mesh materials forming the closure walls of the trap and also minimizing any tendency for the trap to snag on bottom objects while enabling it to rest stably in operable position on the ocean floor.

As herein disclosed the improved trap comprises a dome-like upper portion which includes a frustoconical frame and open mesh material secured to the frame to form a surrounding side wall, with a pouch-like lower portion depending from the upper portion of the trap and adapted to collapse upwardly and invert into the interior of the dome in order to permit nesting together of like traps in stacked relationship. The pouch-like lower portion preferably comprises a purse, the upper open periphery of which is secured to the frustoconical dome of the trap preferably at a location intermediate the top and bottom of the latter, with the frame carrying an annular ring at the bottom thereof upon which the trap stands when in use. The purse has a bottom opening which is closed by a purse line and through which the trap contents, as they gravitate to the bottom of the depending purse, may be emptied conveniently when desired, by releasing the purse line. The open top of the dome-like upper portion of the trap forms the trap entrance.

These and other features, objects and advantages of the invention will become more fully evident from the following description thereof by reference to the accompanying drawings.

FIGURE 1 is a side view of the trap as it appears when suspended by lines, as it would be during hoisting or lowering the same, however, the view shows the purse in full lines in the open condition, and by broken lines showing it drawn closed, as it would be in use.

FIGURE 2 is a top view of the trap.

FIGURE 3 is a perspective view at smaller scale showing the trap as it might appear resting on the ocean bottom in position of use.

FIGURE 4 is a vertical sectional view through a stack of traps illustrating the manner in which they nest compactly together.

Referring to the drawings, the trap comprises a rigid upper portion 10 and a flexible lower portion 12. The upper portion comprises a frustoconical dome-like structure including the downwardly inclined and divergent side members or radial ribs 14 circumferentially spaced about the periphery of the trap and interconnected at their upper ends by a frame ring 16 and at their lower ends by a base ring 18. Spacer loops 20 are formed outwardly from the lower ends of the side members 14 at their intersections with the base ring 18 to provide a footing for the base ring of the next overlying trap when traps are stacked in nested relationship as shown in FIGURE 4. Also, these loops 20 may serve as line tie fasteners. A third frame ring 22 parallel to the top and bottom rings 16 and 18 interconnects the side members 14 intermediate the top and bottom of the upper portion 10 as shown. Preferably the ring 22 is spaced upwardly from the bottom ring 18 by approximately one-quarter to one-third the height of the upper portion 10. Nylon netting or other suitable open mesh material 24 is secured to the side members 14 to form a complete side wall for the trap between the rings 16 and 22.

The top ring 16 defines the entrance of the trap in this illustrated embodiment. Fingers or "triggers" 26 project downwardly and inwardly part way across the central opening within the ring 16 as a means to prevent crabs escaping from the trap once they have entered through the opening, while not interfering with the admission of crabs. These fingers are not new in crab traps.

The lower portion 12 of the trap comprises a downwardly tapered purse 28 of nylon netting or other suitable flexible material the upper end of which is peripherally secured to the rigid upper portion 10, preferably to the ring 22 above the base ring 18, to close the bottom of the trap. The purse 28 hangs below the ring 18 when the trap is suspended out of contact with a supporting surface. The purse 28 has a bottom opening 30 and a drawstring 32 passing through rings or eyes 34 at intervals around the periphery of the bottom opening as a means to close the opening. When the drawstring is tightened to close the bottom opening, the purse appears as shown in broken lines in FIGURE 1 and the drawstring may be secured as shown to a point on the trap frame such as one of the eyes 20. Bait carried in the purse is thus generally centered in the trap when the trap comes to rest on the ocean floor and the purse spreads out flat within the outline of the outer frame. The crabs within the trap gravitate to the bottom of the purse when the trap is suspended, so that the trap can be emptied merely by releasing the drawstring with the trap suspended above the hold of the boat, in order to dump the contents of the trap directly into the hold or onto a sorting table if desired.

In FIGURE 1 the trap is shown suspended from lines L secured to the top ring 16. This is a convenient means to hoist and lower the trap. However, if desired, the securing lines may be tied as in FIGURE 3 wherein a bridle is formed having ends connected to spaced eyes 20. In FIGURE 3 the trap is shown resting on the ocean bottom. In this condition the base ring 18 provides a stable support for the trap and holds the netting material 24 up off the bottom so that it is not caught between portions of the heavy trap and sharp rocks or other abrasive materials. The closed purse 28 rests directly on the bottom but is not under stress or abrasive action because no part of the trap itself rests upon the purse under these circumstances. Because the base ring 18 is a continuous ring of regular form, there is no likelihood or tendency for it to catch on bottom objects.

In FIGURE 4 the nestability of the improved traps appears. It will be evident in this figure that a large number of these traps, despite their large diameter, may be stacked vertically in a single stack and conveniently removed therefrom for setting of the traps when desired. Thus, the deck space of a boat is used efficiently and a great many more traps may be carried than in conventional practice. When the traps are nested, the bags or purses 28 of each trap which overlies another, though the purse line be drawn, assumes an inverted condition wherein it fits upwardly into the dome-like interior of the upper portion of the trap of which it is a part, thus to allow the upper portion of the next underlying trap to be received in the same space. Nor is there any tendency for the netting materials in one trap to catch on parts of another trap. The depth of each pouch and the length of the drawstring on each trap is such that neither the pouch nor the drawstring of a trap sags down far enough into the entrance of the next underlying trap as to catch on the fingers 26 of the latter and interfere with separating the traps from their stacked positions. The traps may be stacked in nested relationship in the same manner whether the purses are open or closed.

While the lower edge of the trap side wall 24 is located above the bottom ring 18 this does not materially reduce the capacity of the trap and, in fact, the capacity of the improved trap of the same outside dimensions as a conventional trap is at least equal to the latter. The lower edge of the side wall 24 should be sufficiently near the trap bottom to insure that crabs can readily climb up the side wall in order to gain access to the entrance opening defined by the upper ring 16.

It will be evident that in some applications of the invention the entrance to the trap may be at a different location than that shown, and if the entrance were to be located in a side wall, the trap still would have the advantages of nestability.

These and other aspects of the invention will be recognized by those skilled in the art from the foregoing disclosure of the presently preferred practices thereof.

I claim as my invention:

1. A crab trap comprising a geometrically truncated, substantially rigid enclosure structure open at the top to admit crabs and having a surrounding open-mesh continuous side wall defining an enclosure which diverges downwardly from said open top, said structure having a laterally outlying supporting base at its bottom adapted to rest on the ocean floor, said side wall having a lower edge extending peripherally therearound at an intermediate level of height materially above said base and thereby substantially out of contact with the ocean floor upon which the trap rests, and bottom closure means comprising a dependingly supported purse of flexible netting material having a substantially continuous upper edge portion joined peripherally to said side wall lower edge so as to suspend the purse therefrom free of engagement with said supporting base situated laterally outwardly from said purse, said purse having a sufficient span of material downwardly from its upper edge portion to rest upon the ocean floor with the trap positioned thereon and to permit inverting the purse upwardly into the interior of the trap and against the side wall so as to accommodate the enclosure structure of a similar trap nested therewith in stacked relationship with a major portion of the height of the traps overlapping each other.

2. The trap defined in claim 1, wherein the purse has a bottom opening, and releasable means operable to close said bottom opening.

3. The trap defined in claim 2, wherein the enclosure structure comprises a relatively small rigid top ring, a relatively large rigid bottom ring comprising the supporting base, and downwardly divergent rigid ribs interconnecting said top and bottom rings in vertically spaced relationship.

4. The trap defined in claim 3, wherein the enclosure structure further comprises a third ring intermediate the size of the top and bottom rings joined to the ribs at an intermediate level of height between the top and bottom rings, with the upper edge portion of the purse being secured to said third ring.

5. The trap defined in claim 1 wherein the enclosure structure comprises a relatively small top rigid ring, a relatively large rigid bottom ring comprising the supporting base, and downwardly divergent rigid ribs interconnecting said top and bottom rings in vertically spaced relationship.

6. The trap defined in claim 5, wherein the enclosure structure further comprises a third ring intermediate the size of the top and bottom rings joined to the ribs at an intermediate level of height between the top and bottom rings, with the upper edge portion of the purse being secured to said third ring.

References Cited by the Examiner

UNITED STATES PATENTS

| 404,946 | 6/1889 | Anderson | 43—11 |
| 405,957 | 6/1889 | Freyschlag | 43—11 |
| 897,589 | 9/1908 | Connevey | 43—65 |
| 3,029,546 | 4/1962 | Ruiz | 43—105 |

FOREIGN PATENTS 168,920  10/1959  Sweden.

SAMUEL KOREN, *Primary Examiner.*

W. H. CAMP, *Assistant Examiner.*